(12) United States Patent
Neathery et al.

(10) Patent No.: US 8,518,353 B1
(45) Date of Patent: Aug. 27, 2013

(54) REDUCED SORBENT UTILIZATION FOR CIRCULATING DRY SCRUBBERS

(71) Applicants: James K. Neathery, Lexington, KY (US); Angelos Kokkinos, Ayer, MA (US); James D. Dougherty, Boxford, MA (US); Matthew Quitadamo, West Boylston, MA (US)

(72) Inventors: James K. Neathery, Lexington, KY (US); Angelos Kokkinos, Ayer, MA (US); James D. Dougherty, Boxford, MA (US); Matthew Quitadamo, West Boylston, MA (US)

(73) Assignee: Babcock Power Development LLC, Worcester, MA (US)

( * ) Notice: Subject to any disclaimer, the term of this patent is extended or adjusted under 35 U.S.C. 154(b) by 0 days.

(21) Appl. No.: 13/647,516

(22) Filed: Oct. 9, 2012

(51) Int. Cl.
- B01D 53/34 (2006.01)
- B01D 53/75 (2006.01)
- B01D 53/83 (2006.01)
- B01J 8/24 (2006.01)

(52) U.S. Cl.
USPC ............ 423/210; 423/244.01; 423/244.08; 422/139; 422/145; 422/147; 422/168

(58) Field of Classification Search
USPC ............ 423/210, 244.01, 244.08; 422/139, 422/145, 147, 168
See application file for complete search history.

(56) References Cited

U.S. PATENT DOCUMENTS

| | | | |
|---|---|---|---|
| 3,873,532 A | 3/1975 | Dahlstrom et al. | |
| 3,989,464 A | 11/1976 | Dahlstrom et al. | |
| 4,226,831 A | 10/1980 | Dilworth | |
| 4,276,062 A | 6/1981 | Lyon et al. | |
| 4,277,450 A | 7/1981 | Dilworth | |
| 4,539,188 A * | 9/1985 | Hirsch et al. | 423/210 |
| 4,588,559 A | 5/1986 | Emmett | |
| 4,600,570 A | 7/1986 | Lin | |
| 4,670,237 A * | 6/1987 | Graf et al. | 423/244.07 |
| 4,969,934 A | 11/1990 | Kusik et al. | |
| 5,032,143 A * | 7/1991 | Ritakallio | 23/313 FB |
| 5,039,499 A | 8/1991 | Stowe, Jr. | |
| 5,270,015 A | 12/1993 | Rochelle et al. | |
| 5,273,721 A | 12/1993 | Hallstrom | |
| 5,318,227 A | 6/1994 | Rogers | |
| 5,343,830 A * | 9/1994 | Alexander et al. | 122/4 D |
| 5,439,659 A | 8/1995 | Izumo | |
| 5,850,977 A | 12/1998 | Csendes | |
| 6,290,921 B1 * | 9/2001 | Kuivalainen et al. | 423/210 |
| 6,325,985 B1 * | 12/2001 | Koskinen et al. | 423/239.1 |
| 6,488,901 B1 * | 12/2002 | Schmidt et al. | 423/148 |
| 6,946,102 B2 | 9/2005 | Steinke | |
| 7,595,033 B2 | 9/2009 | Frey et al. | |
| 7,776,298 B2 * | 8/2010 | Herden et al. | 423/242.1 |
| 7,794,524 B2 | 9/2010 | Jepsen et al. | |
| 7,887,769 B1 | 2/2011 | Smith | |
| 7,901,485 B2 | 3/2011 | McCutchen | |
| 7,998,446 B2 | 8/2011 | Pfeffer et al. | |
| 2007/0092427 A1 | 4/2007 | Anthony et al. | |

* cited by examiner

*Primary Examiner* — Timothy Vanoy

(74) *Attorney, Agent, or Firm* — Edwards Wildman Palmer LLP; Joshua L. Jones

(57) ABSTRACT

Circulating dry scrubbing (CDS) systems and methods utilizes a particle classification unit operation to separate unreacted sorbent (such as lime, limestone, or sodium-based sorbent) such that a reactive fraction of the cut stream may be selectively recovered to a flue gas scrubbing system. This reduces the amount of fresh sorbent that must be supplied for pollutant removal.

20 Claims, 4 Drawing Sheets

1

REDUCED SORBENT UTILIZATION FOR CIRCULATING DRY SCRUBBERS

BACKGROUND OF THE INVENTION

1. Field of the Invention

The present invention relates to exhaust gas treatment and in particular to circulating dry scrubber (CDS) systems and methods utilizing sorbent particles to treat exhaust gases for pollution reduction.

2. Description of the Related Art

CDS technology has many advantages over other FGD systems such as limestone wet FGD and lime-based spray drying absorption (SDA). Among the most appealing benefits of CDS are: low capital costs, small footprint, simple construction with few moving parts, carbon steel construction, the absence of a liquid blow-down stream to be treated, and the production of a dry spent sorbent product. However, limestone wet FGD systems continue to dominate the emissions control marketplace due to their inherently low operating costs. This is primarily due to the efficient use of an inexpensive limestone feedstock. Limestone scrubbers typically are able to achieve greater than 90% sulfur capture with a stoichiometric ratio (moles calcium carbonate fed per moles sulfur dioxide captured) approaching one.

The concept of circulating dry scrubbing is well known in the art. See, for example, Neathery, J. K., "A Fundamental Study of Circulating Bed Absorption for Flue Gas Desulfurization", Ph.D. Dissertation, University of Kentucky, 1993. CDS technology incorporates dry sorbent recirculation in a lean-phase transport reactor to achieve sulfur capture. Hydrated lime and humidification water are injected into the bottom of a reaction chamber concurrently with flue gas. The flue gas suspends, dries, and transports the sorbent through the reaction vessel and out into a particulate collector. To maintain suspension in the reaction vessel under varying loads from the furnace, a large portion of both the spent and unutilized sorbent streams are recycled into the reactor vessel as a dry powder. The recycle of sorbent, from both within the reactor and via the particulate control device, improves the sorbent utilization over other semi-dry methods such as spray drying absorption (SDA). However, since the flue gas is to remain several degrees above the wet bulb or saturation temperature, the liquid phase coverage of the recycled solids quickly evaporates due to the excellent mass transfer and the abundant surface available in the riser section.

Although CDS is called a "dry" scrubbing process, it is water, either adsorbed or sprayed onto the sorbent material, that is the reactive phase accomplishing $SO_2$ capture with lime to form a $CaSO_3/CaSO_4$ reaction product. Fresh hydrated lime and recycled sorbent particles capture a portion of the water droplets from humidification spray nozzles by a combination of inertial impaction and interception. The internal reflux rate of these internally recycled particles can be of the same order as the fine particulate recycled externally from a bag house or electrostatic precipitator (ESP). If the resulting sorbent slurry were to completely cover every CDS particle equally, the thickness of the slurry layer would range from 0.1 to 0.6 μm, depending on the volumetric rate of humidification water (i.e., the approach-to-saturation temperature or AST) and the reactor solids concentration.

As the wetted area of each particle begins to evaporate, $SO_2$ is absorbed and reacts with the dissolved $Ca(OH)_2$ to form mostly $CaSO_3 \cdot H_2O$. Since $CaSO_3$ is relatively insoluble under these conditions, fine crystals will precipitate in solution and tend to block or cover unused hydrate surface area. When the water phase completely evaporates, the $SO_2$ reaction is nearly halted. Previous experiences with measuring the evaporation rate within the riser section have shown that this bulk liquid phase can evaporate in a time on the order of one second. One could easily improve the utilization of the lime sorbent by adding additional humidification spray water. However, as the approach-to-saturation temperature is lowered, the flow properties of the recycle material can be compromised. In addition there can be issues of the removing particulate from either a baghouse or ESP device that can be encountered. Deposition of solids within the riser and within the recycle conveying system is also an operational concern the lower is the approach-to-saturation temperature.

Previous works on improving sorbent utilization for dry scrubbing technologies have focused on several areas including: optimization of the initial surface area of the virgin lime hydrate with additives including fly ash; suppressing the water vapor pressure of the liquid phase by dissolved salts from plant waste streams to slow water phase evaporation thereby extending the desulfurization reaction; and creating lime/silicate ash sorbents.

Optimization of Initial Lime Hydrate Surface Area.

It has been shown that superior surface area can be obtained using the reaction of hydrated lime with coal fly ash mixtures. See, e.g., Jozewicz, W., Jorgensen, C., Chang, J. C. S., Sedman, C. B. and Brna, T. (1988a) Development and pilot plant evaluation of silica-enhanced lime sorbents for dry flue gas desulfurization. J.A.P.C.A. 38, 796-805. Incorporating this feature into dry lime slaking systems would be problematic since the advantages of the dry method would be negated. In order to take advantage of the formation of high surface area calcium silicate/aluminates solids, a wet slurry system with sufficient hold-up to allow for sufficient reaction times would need to be implemented. Many of the experimental results for these sorbents were obtained with very long reaction times (>16 hours); however, a sufficient amount of increased surface area can be realized in less than 30 minutes.

Reactivation of Lime in the External Sorbent Recycle Stream.

The resulting unreacted calcium sorbent in the CDS recycle stream is due in large part to $CaSO_3$ filling of mesopores and blocking pathways to fresh sorbent surfaces. The addition of water to the ground mixture may also provide additional activation by allowing for diffusion of solubilized calcium hydrate. The recycle flow rate is on the order of 100 times that of the fresh sorbent. Consequently, treating or reactivating the entire recycle stream is not practical, especially if the activation method includes water. However, it has been proposed that, if only a 1-2% of the recycle stream is sufficiently reactivated and rehydrated, then the sorbent ratio could be decreased dramatically. Ash present in the recycle stream could promote the formation of high surface area calcium silicate/aluminate in the reactivated sorbent. See, e.g., Liu, Chiung-Fang, Shin-Min Shih, and Ren-Bin Lin, "Effect of Ca(OH)2/fly ash weight ratio on the kinetics of the reaction of Ca(OH)2/fly ash sorbents with SO2 at low temperatures," Chemical Engineering Science 59 (2004) 4653-4655 and Garea, A., J. R. Viguri and A. Irabien, "Kinetics of flue gas desulphurization at low temperatures: fly ash/calcium (3/1) sorbent behavior," Chemical Engineering Science, Vol. 52, No. 5, pp. 715-732, 1997. See also Ren-Bin Lin, Shin-Min Shih, and Chiung-Fang Liu, "Structural Properties and Reactivities of Ca(OH)2/Fly Ash Sorbents for Flue Gas Desulfurization," Ind. Eng. Chem. Res. 2003, 42, 1350-1356.

Suppressing the Water Vapor Pressure by Additives and Extending the Presence of a Reactive Liquid Phase.

The addition of deliquescent salts into CDS systems has been shown to effectively increase sorbent utilization. See, e.g., Ruiz-Alsop, R., G. Rochelle, "Effect of deliquescent salt additives on the reaction of $SO_2$ with dry $Ca(OH)$," ACS Symp. Ser. 319 (1986) 208. However, the equilibrium moisture content of the spent solids is much higher as a result. Consequently, problems related to solids deposition and difficulties in cleaning filter cakes from fabric filtration devices may be an issue if the salts are over-fed. Additionally, additives such as calcium chloride will add to operating costs. One economical option to consider for vapor pressure depression is using dissolved salts/solids from plant waste streams such as cooling tower and wet FGD blow-down stream for humidification water.

Such conventional methods and systems have generally been considered satisfactory for their intended purpose. However, there is still a need in the art for systems and methods that allow for improved sorbent utilization in CDS systems. There also remains a need in the art for such systems and methods that are easy to make and use. The present invention provides a solution for these problems.

SUMMARY OF THE INVENTION

The subject invention is directed to a new and useful circulating dry scrubber system. The system includes a circulating dry scrubber reactor configured to reduce pollutants from flue gas by passing flue gas through circulating particles of sorbent within the reactor. A particulate capture component is in fluid communication with the reactor for filtering particles out of a stream of treated flue gas from the reactor. A recycle diverter is connected to the particulate capture component to receive sorbent particles therefrom for separating particles into a recycle stream connected to the reactor for reuse in the reactor, and a purge stream typically sent to a landfill. A classifier is operatively connected to receive particles from the purge stream. The classifier is configured to separate particles from the purge stream into a coarse solids recovery stream connected to recover coarse solids from the classifier and fed into the reactor, and a waste stream for disposal of fine particles from the classifier.

In accordance with certain embodiments, the system can include a heated motive gas stream in fluid communication with the classifier for fluidizing reagent particles during classification. The coarse solids recovery stream can be connected to inject recovered coarse reagent particles into the reactor proximate a position where the recycle stream injects recycled reagent particles into the reactor.

In certain embodiments, the classifier is a dynamic classifier, cyclone, settling chamber, fluidized bed classifier, sieve screen separator, triboelectric separator, electrostatic precipitator, or any other suitable type of classifier. The classifier preferably is operatively connected to continuously receive particles from the purge stream and to continuously recycle coarse solids to the reactor. The classifier can be configured and adapted to divert preferably up to about the coarsest 30% of reagent particles from the purge stream into the coarse solids recovery stream, or any other suitable amount. In another aspect, the classifier can be configured and adapted to divert particles preferably greater than about 50-70 µm in diameter into the coarse solids recovery stream, or any other suitable diameter. It is also contemplated that the classifier can be configured to separate between about 5 wt % to about 25 wt % of reagent particles into the coarse solids recovery stream, with the particles in the coarse solids recovery stream having about 25 wt % or more of active sorbent.

The invention also provides a circulating dry scrubbing process. The process includes passing flue gas through circulating particles of sorbent within the reactor of a circulating dry scrubber system as described above to reduce pollutants from flue gas. The process includes filtering particles out of a stream of treated flue gas from the reactor with the particulate capture component in fluid communication with the reactor, and separating particles into the recycle stream connected to the reactor for reuse in the reactor, and into the purge stream using the recycle diverter connected to the particulate capture component to receive sorbent particles therefrom. The process also includes recovering coarse particles from the purge stream by classifying particles from the purge stream into the coarse solids recovery stream connected to recover coarse solids from the classifier into the reactor, and the waste stream for disposal of fine particles from the classifier.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
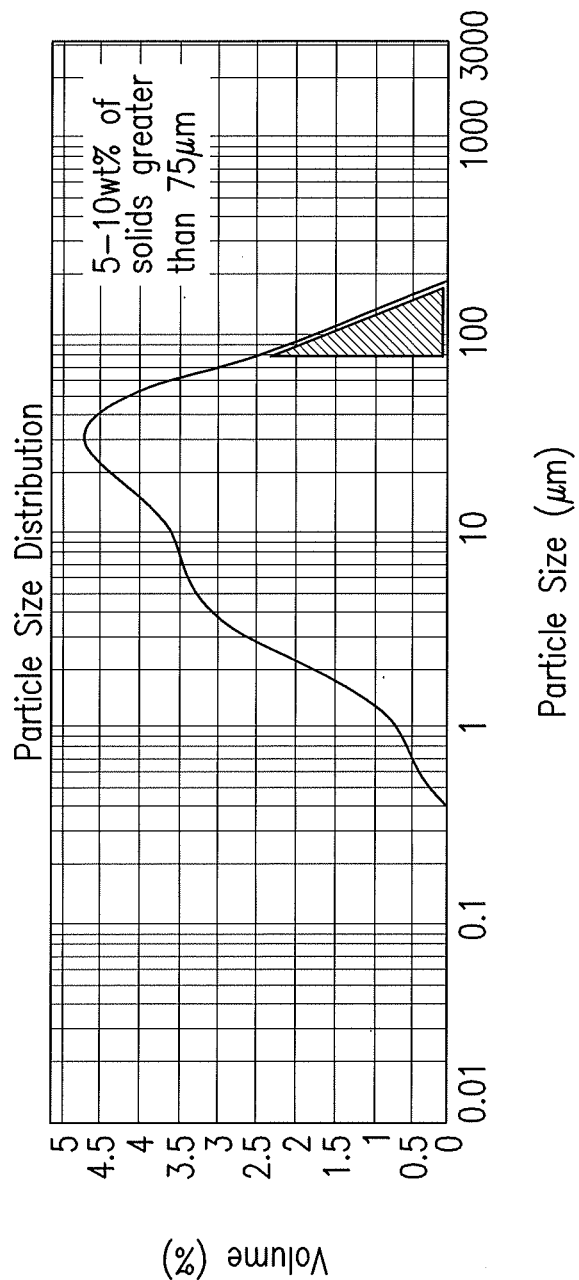
FIG. 1 is a graph of a typical particle size distribution of a CDS recycle stream.

Reference will now be made to the drawings wherein like reference numerals identify similar structural features or aspects of the subject invention. For purposes of explanation and illustration, and not limitation, a partial view of an exemplary embodiment of a circulating dry scrubber (CDS) system in accordance with the invention is shown in FIG. 4 and is designated generally by reference character 100. Other features of circulating dry scrubber systems in accordance with the invention, or aspects thereof, are provided in FIGS. 1-3, as will be described. The systems and methods of the invention can be used to reduce the amount of fresh reagent utilized to remove pollutants from flue gas using circulating dry scrubbing.

The present invention includes a method for improving lime, limestone, or sodium-based sorbent utilization in CDS systems by recovering unreacted sorbent particles that have been purged for disposal from a recycle stream and sending them to the CDS reactor. In a typical CDS system, a sorbent, typically calcium or sodium-based, is injected into a riser reactor and suspended by the velocity of the incoming flue gas containing $SO_2$. Liquid water droplets are simultaneously sprayed into the riser along with the sorbent particles. The water droplets tend to evaporate in the hot flue gas as the temperature of the flue gas is consequently lowered. Before complete evaporation of this water phase, most of the droplets interact with the sorbent particles and nascent fly ash particles to form a reactive liquid interface to absorb $SO_2$ in the flue gas to form a solid byproduct. After the liquid phase has evaporated, the $SO_2$ absorption reaction is essentially stopped, leaving a dry byproduct solid along with unreacted sorbent material.

The dry unreacted sorbent and byproduct material exits the scrubber riser and is captured in a bag house fabric filter, electrostatic precipitator, or a cyclone device. In a typical CDS system, about 95-99% of the captured solid materials are recycled back to the fluid bed riser in an effort to increase the sorbent utilization. The remaining solids materials are purged from the CDS system for disposal. This purge stream contains fly ash, sorbent byproduct, and unreacted sorbent. In some cases, the concentration of unreacted sorbent solids can exceed 20 wt % of this purge stream. This loss of unreacted sorbent in the purge stream, as well as the loss due to spent sorbent in the reaction, must be replenished by the addition of fresh sorbent, thereby increasing the required sorbent-to-sulfur ratio for the CDS system.

A principle advantage of the proposed invention is that the selective recycle of the unreacted sorbent to the CDS riser will improve sorbent utilization and lower the overall sorbent ratio. At the heart of the proposed invention is the fact that about 5-20 wt % of the purge stream contains a high concentration of unreacted sorbent in particles greater than about 75 μm diameter. The coarse particles rich in unreacted sorbent can be collected from the purge stream and recycled back to the reactor, thereby lowering the fresh sorbent requirement. Likewise, the purge stream, now diminished of unreacted coarse particles will effectively increase the overall sorbent utilization and incrementally decrease the rate of waste material that must be landfilled or disposed by other expensive methods.

It is believed that the turbulent nature of the CDS reactor tends to attrite these particles and open pathways for water droplets and subsequent reaction with $SO_2$ gas. In parallel to this attrition phenomenon, there is also an aggressive agglomeration mechanism where the circulated particles pick up a layer of both sorbent and sulfite byproduct solids with each pass through the riser. The resulting onion-like structure will lock away unreacted sorbent until the particle has been eroded or broken up from the inherent turbulence of the fluidized bed. Consequently, there is equilibrium between the attrition/erosion and agglomeration mechanisms resulting in a particle size distribution containing both large and small particles ranging from 0.1 to greater than 200 μm passing through the riser. Thus, it has been discovered that coarse particles can be diverted from the purge stream and recycled to provide significant economic benefits for the system and reduce the use of virgin sorbent.

The yield of the unreacted sorbent will depend on many operational variables including the type of flue gas being treated, the particle size distribution of the fresh sorbent, and the geometry of the gas venturi or distributor. The device used to recover the larger sorbent particles can be any suitable active or passive classifier device. Preferably, the classifier for this purpose should require minimal energy and motive gas to operate. One preferred embodiment of the process would include a dynamic classifier that could be selectively tuned to optimize the sorbent recovery. Other devices know to selectively classify particles such as settling chambers; cyclones; fluid bed classifiers; sieve screen separators; tribo electrostatics (triboelectric) separators; and electrostatic precipitators could be effective in the proposed process scheme.

Referring now to FIG. 1 there is shown a particle size distribution for the recycle solids stream from a commercial CDS unit (operating under a light load, e.g., low sulfur load, low unit load, or the like) measured using a light scattering technique. The solids were ultrasonically dispersed in a non-aqueous propanol solution. The size distribution plot is from recycle solids of a utility-scale CDS using a dry hydrated lime sorbent for $SO_2$ capture. The plot shows that approximately 5-10 wt % of the solids are greater than 75 μm or +200 mesh, as indicated by the gray triangle in FIG. 1.

Figure 2:
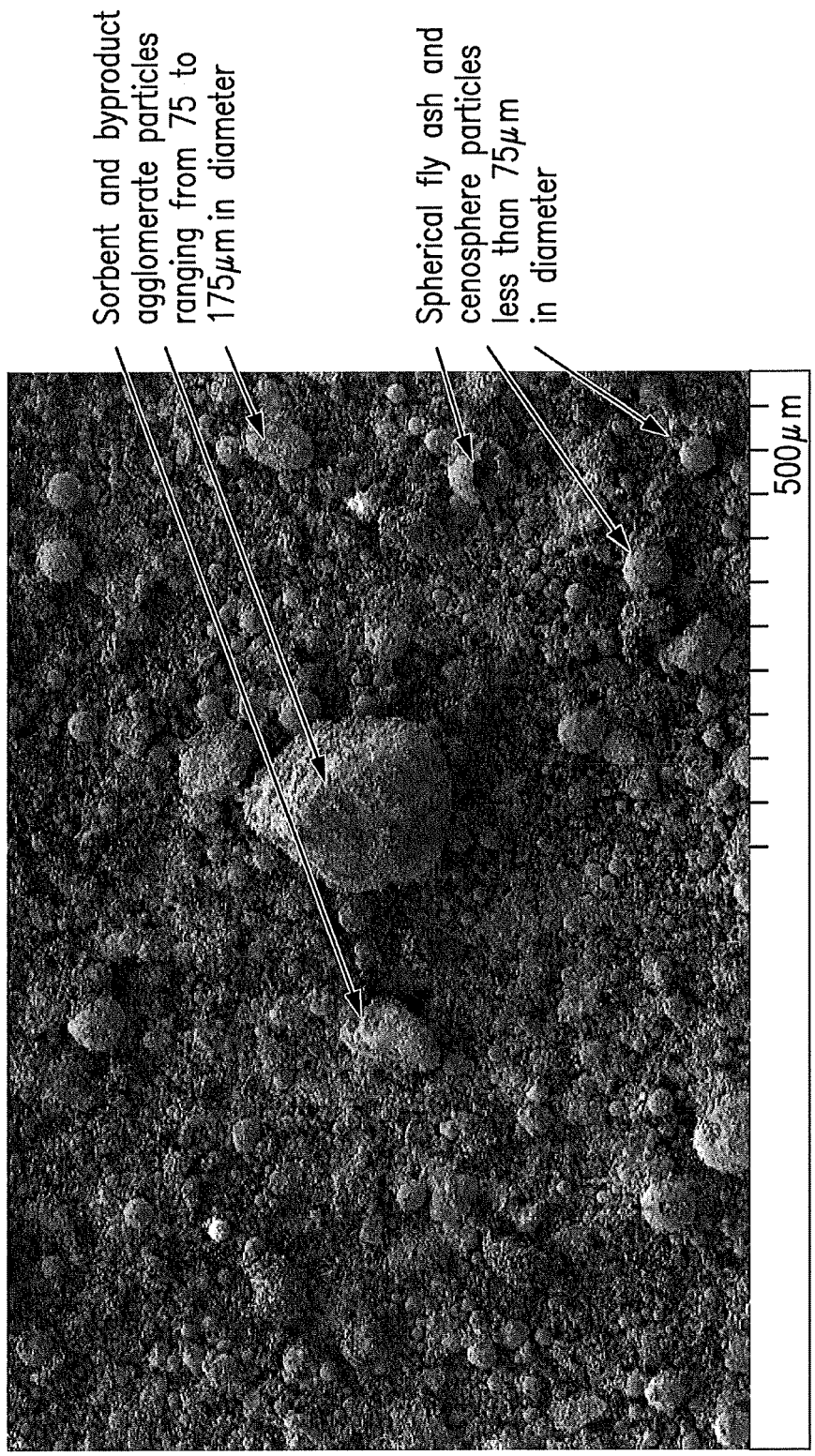
FIG. 2 is scanning electron micrograph image of CDS recycle material showing the distribution of particle morphologies of both fly ash and sorbent particles.

Referring now to FIG. 2, is shown a scanning electron microscope micrograph image of recycle solids from a utility-scale CDS system that operated with coal-fired flue gas from a pulverized coal furnace. It was observed from this image that solids consist predominately of fly ash, shown as spherical particles less than approximately 75 μm. The sorbent particles can be seen as the larger particles greater than 75 μm with a less spherical shape than that of the fly ash.

Referring now to Table 1, chemical analyses of various sieve fractions of the CDS solids material are displayed. It may be seen that the coarse fractions of the recycle material contains more unreacted lime and less ash than the parent or as-received solid sample. The lowest calcium utilization of 0.56, defined as moles sulfur reacted per mole of calcium, was found in the coarse +100 mesh (>150 μm diameter) sieve fraction of the CDS solids. Therefore, the unreacted calcium content was as high as 18 wt % as compared to 5 wt % for the as-received parent sample. This fraction also contained less ash as evidenced by the lower $SiO_2$ and $Al_2O_3$ content.

TABLE 1

Major chemical analyses of various size fraction of circulating dry scrubber recycle solids stream.

| | % $SiO_2$ | % $Al_2O_3$ | % $Fe_2O_3$ | % CaO | % MgO | % $Na_2O$ | % $K_2O$ | % $P_2O_5$ | % $TiO_2$ | % $SO_3$ | Ca/S Ratio | Utilization Fraction | Avail. Ca Wt % as CaO |
|---|---|---|---|---|---|---|---|---|---|---|---|---|---|
| +100 mesh fraction >150 microns | 15.57 | 6.51 | 2.04 | 40.96 | 0.78 | 0.15 | 0.46 | 0.03 | 0.27 | 32.8 | 1.78 | 0.56 | 17.97 |
| +140-100 mesh 100-150 microns | 30.49 | 12.99 | 3.72 | 26.65 | 0.87 | 0.16 | 1.08 | 0.09 | 0.49 | 24.59 | 1.55 | 0.65 | 9.41 |
| +200-140 mesh 75-100 micron | 42.39 | 22.07 | 7.26 | 13 | 1.02 | 0.17 | 1.84 | 0.15 | 0.87 | 12.62 | 1.47 | 0.68 | 4.15 |

TABLE 1-continued

Major chemical analyses of various size fraction of circulating dry scrubber recycle solids stream.

| | % SiO$_2$ | % Al$_2$O$_3$ | % Fe$_2$O$_3$ | % CaO | % MgO | % Na$_2$O | % K$_2$O | % P$_2$O$_5$ | % TiO$_2$ | % SO$_3$ | Ca/S Ratio | Utilization Fraction | Avail. Ca Wt % as CaO |
|---|---|---|---|---|---|---|---|---|---|---|---|---|---|
| −200 mesh fraction <75 microns | 42.23 | 23.14 | 8.13 | 11.5 | 1.03 | 0.17 | 1.93 | 0.16 | 0.95 | 11.37 | 1.44 | 0.69 | 3.53 |
| As-received CDS Solids Sample | 42.56 | 22.95 | 7.88 | 12.56 | 1.04 | 0.19 | 1.9 | 0.15 | 0.92 | 10.91 | 1.64 | 0.61 | 4.91 |

Figure 3:
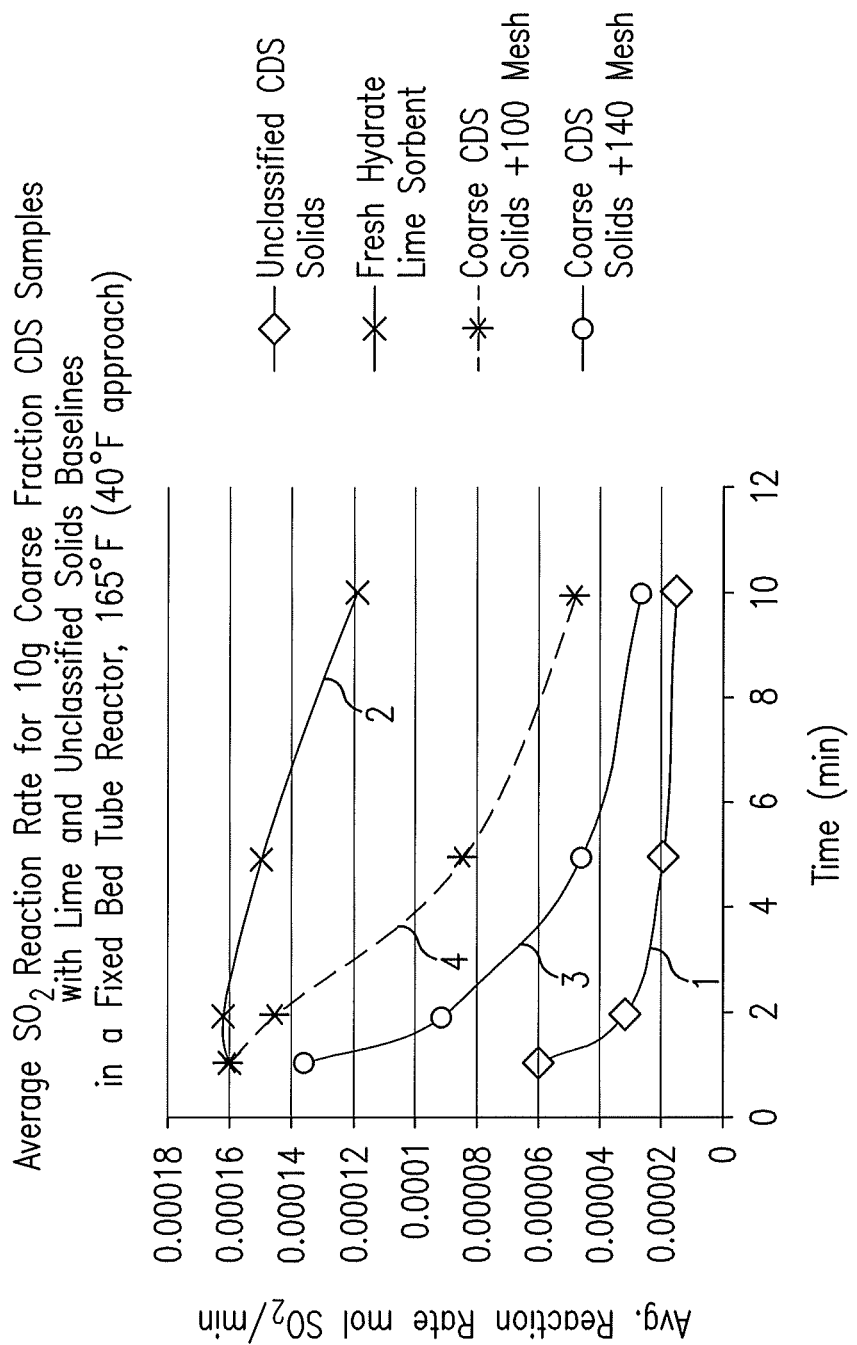
FIG. 3 is a graph of the solids reactivity of coarse solids as compared to baseline recycle solids and hydrated lime.
Figure 4:
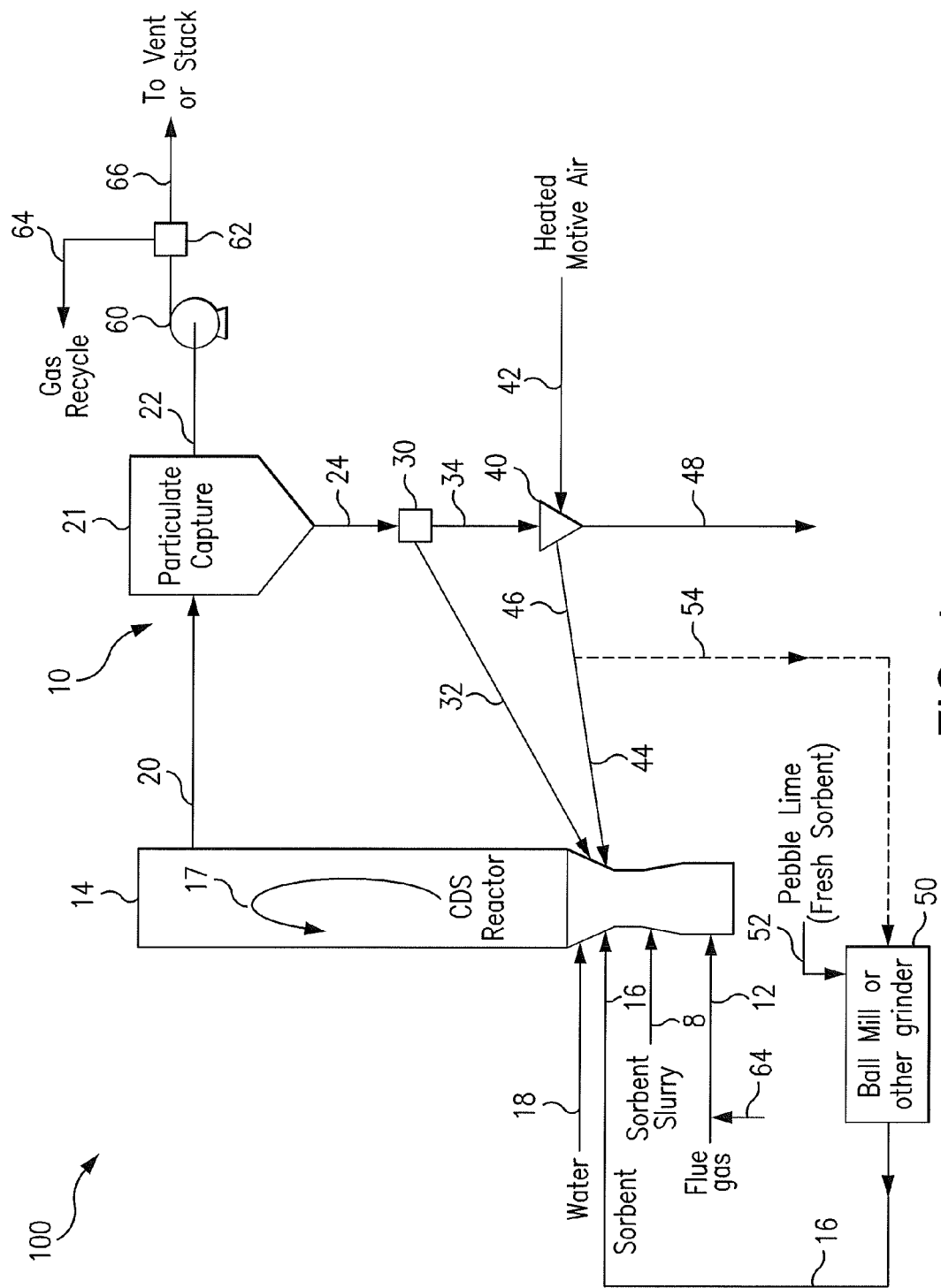
FIG. 4 is a schematic of an exemplary embodiment of a sorbent recovery arrangement constructed in accordance with the present invention, showing the CDS reactor and a recovery stream for recovering particles from the waste stream for reuse in the CDS reactor.

Referring now to FIG. 3, there is shown a graph of experimental reactivity data (in terms of reaction rate in moles/min of SO$_2$ per 10 grams of sample) for coarse solid fractions of CDS solids as compared to baseline samples of unclassified recycle solids and fresh hydrated lime sorbent. In addition to the baseline samples, coarse fractions of the as-received CDS solids were sieved using a 100 and 140 mesh screen to obtain the samples with particles greater than 150 to 100 μm, respectively. All of the samples were tested for SO$_2$ reactivity with a differential reactor similar to that used in Garea, A., J. R. Viguri and A. Irabien, "Kinetics of flue gas desulphurization at low temperatures: fly ash/calcium (3/1) sorbent behavior," Chemical Engineering Science, Vol. 52, No. 5, pp. 715-732, 1997. The samples were loaded into a 0.75" ID reactor tube and dispersed with 2 mm inert glass beads. The tube, loaded with 10 g of sample, was heated externally to 165° F. by an electric furnace in order to simulate process conditions typical of a lime-based dry scrubber. The samples were first pretreated with humidified nitrogen for 1-hour to ensure a layer of moisture covered the surface of the sorbent. After humidification, the samples were exposed to 2500 ppm of SO$_2$ in N$_2$ gas with water vapor. The degree of the gas saturation was within 35-40° F. of the saturation or wet-bulb temperature. The molar rate of SO$_2$ exiting the tube in the simulated flue gas was calculated by measuring the exit gas concentration and volumetric flow rate of the carrier gas. By measuring the inlet mass flow of the SO$_2$ and nitrogen, the molar rate of SO$_2$ absorption was determined by difference. As shown in FIG. 3, the average reactivity curves are plotted in 1, 2, 5, and 10-minute timescales. The unclassified CDS solids and fresh lime sorbent reactivity curves are labeled in FIG. 3 as curves 1 and 2, respectively. Also plotted in FIG. 3 are the reactivity curves for the +100 mesh (curve 4) and +140 mesh (curve 3) samples. The initial reactivity of the +100 mesh sample (curve 4) was as high as the baseline fresh sorbent, curve 2, and quickly decreased below the fresh lime rate after 2 minutes of reaction time. The finer +140 mesh sample exhibited an initial reaction rate lower than that of the hydrated lime (curve 2) and the +100 mesh (curve 4) samples.

Referring now to FIG. 4, there is shown an embodiment of the current invention integrated downstream of a combustor for a typical flue gas desulfurization system 10. A sulfur dioxide-laden flue gas stream 12 flows into the bottom section of the circulating dry scrubber reactor 14. Fresh sorbent, either as a hydrate powder stream 16 or as a slurry stream 8, is injected above or below a gas distributor within the reactor 14. Hydrated sorbent at the desired conditions can be delivered or prepared on site. When the sorbent is prepared on site, a ball mill 50 can be used to reduce the particle size distribution of hydrated sorbent material 52 leaving the hydrator.

Nearby the injection location of the sorbent stream 16 or 8, a water stream 18 is injected via one or more atomization nozzles. The water droplets from the water spray 18 interact and capture solids from stream 16 or 8 and recycled sorbent particles from streams 32 and 44. The solid particles coated with liquid water flow concurrently with the flue in an upward fashion inside the reactor 14 and eventually exit the riser via stream 20. However, a portion of the larger solids within the riser will tend to be internally recycled, as indicated by arrow 17, within the reactor 14 and flow down along the walls of the reactor vessel and will again contact the water droplets from stream 18 and SO$_2$ from the flue gas stream 12.

The scrubbed flue gas and ejected particles from the reactor 14 are transported in stream 20 to a particulate collection device 21. This device may be a fabric filter baghouse, ESP, cyclone, or other devices effective in efficiently capturing particles of fly ash, sorbent, and reaction byproducts. The filtered and scrubbed flue gas exits the particulate collector device 21 via stream 22. An induced draft fan 60 boosts the pressure of the scrubbed flue gas before entering a flow-splitting device 62. A portion of the scrubbed flue gas typically is diverted in stream 64 back to the reactor vessel 14, such that a minimum superficial velocity within the reactor 14 is maintained at low load conditions in order to fully fluidize the solid particles. Flue gas not diverted in device 62 is routed to a vent or stack via stream 66.

Solids captured in the particulate collection device 21, are transported via stream 24 to a recycle diverter device 30. The flow rate of solids diverted in device 30 to a purge stream 34, is controlled to maintain a set point axial differential pressure across the reactor 14. In a typical CDS system, 95-99% of the solids entering the recycle diverter 30 will be channeled back to the reactor 14 via solids recycle stream 32. The method of transport for stream 32 is typically an air-slide or a fluidized bed conveyor. Other means of transport for stream 32 may be used in the proposed concept without affecting the optimum recovery of sorbent particles. In accord with the present invention, the particles diverted from device 30 are conveyed via purge stream 34 to a classifier device 40. The classifier device 40, may be an active or passive classification unit operation, such as a dynamic classifier, cyclone, settling chamber, fluidized bed classifier, sieve screen separator, triboelectric separator, ESP, or other devices that can effectively separate the coarse particles (greater than 50-70 μm in diameter). Regardless of the classification technology used for device 40, a preferably heated motive gas stream 42 can be used to entrain or fluidize the solids during the classification/separation process. The fine particles from classifier device 40 exit via stream 48 and transported to a waste handling system for subsequent disposal in a landfill. The classification and recovery of coarse particles can be conducted continuously. The coarse solids recovery stream 46 exiting the classifier device 40, may contain up to 30% of the purge stream 34. The optimal fraction of coarse solids extracted in stream 46 will depend on the particle size distribution and unreacted sorbent content of the larger particles contained in purge stream 34. Typically, the coarsest portion of the purge stream 34 (e.g., greater than 100 microns), which makes up approximately 5-25 wt % of the total purge stream 34, contains a much greater concentration of active sorbent (e.g., more than 25 wt %) as compared to the active sorbent concentration in the total purge stream 34 (e.g., lest than 5 wt %). In some cases, the purge stream 34 may have 50 wt % active sorbent, while the coarse stream 46 contains 70 wt %. Those skilled in the art will readily appreciate that the percentages above are exemplary, and that any suitable percentages can be obtained/utilized without departing from the spirit and scope of the invention. Generally, the coarse particles can contain substantially more unreacted sorbent than that of the original purge stream.

The coarse particles in stream 46 may be recycled directly without further processing via stream 44 and injected near the bottom of the reactor vessel 14 nearby the water stream 18 proximate where stream 32 injects recycled reagent, e.g., bypassing comminution in grinding device 50. It is also contemplated that at least some of the coarse particles in stream 46 may optionally be transported to a grinding device 50. This device may be a ball mill or other particle comminutor capable of reducing the average particle diameter and thereby liberating trapped sorbent. The grinding device 50 is optional, and can be a stand-alone device dedicated for grinding recycled sorbent or as shown in the schematic, as a part of the fresh sorbent ball mill or other grinding device. The ground particles containing liberated sorbent, fresh sorbent and motive gas exiting the grinding device 50 via stream 16 are injected into the lower portion of the CDS reactor 14. The active sorbent recycled in either streams 44 or 54 displaces the amount of fresh sorbent required in either streams 16 or 8 to maintain the desired $SO_2$ capture.

The methods and systems of the present invention, as described above and shown in the drawings, provide for circulating dry scrubbing sorbent recovery with superior properties including reduced utilization of fresh sorbent. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A circulating dry scrubber system comprising:
    a circulating dry scrubber reactor configured to reduce pollutants from flue gas by passing flue gas through circulating particles of sorbent within the reactor;
    a particulate capture component in fluid communication with the reactor for filtering particles out of a stream of treated flue gas from the reactor;
    a recycle diverter connected to the particulate capture component to receive sorbent particles therefrom for separating particles into:
        a recycle stream connected to the reactor for reuse in the reactor, and
        a purge stream; and
    a classifier operatively connected to receive particles from the purge stream, wherein the classifier is configured to separate particles from the purge stream into:
        a coarse solids recovery stream connected to recover coarse solids from the classifier and divert them into the reactor, and
        a waste stream for disposal of fine particles from the classifier.

2. A system as recited in claim 1, further comprising a comminutor selectively connected to receive coarse reagent solids from the coarse solids recovery stream for comminution, and to supply comminuted solids to the reactor.

3. A system as recited in claim 1, wherein the classifier is operatively connected to continuously receive particles from the purge stream and to continuously recycle coarse solids to the reactor.

4. A system as recited in claim 1, wherein the classifier is configured and adapted to divide up to about the coarsest 30 wt % of reagent particles from the purge stream into the coarse solids recovery stream.

5. A system as recited in claim 1, wherein the classifier is configured and adapted to divide particles greater than about 50 µm in diameter into the coarse solids recovery stream.

6. A system as recited in claim 1, wherein the classifier is configured and adapted to divide particles greater than about 70 µm in diameter into the coarse solids recovery stream.

7. A system as recited in claim 1, wherein the classifier is of a type selected from the group consisting of a dynamic classifier, cyclone, settling chamber, fluidized bed classifier, sieve screen separator, triboelectric separator, and electrostatic precipitator.

8. A system as recited in claim 1, further comprising a heated motive gas stream in fluid communication with the classifier for fluidizing reagent particles during classification.

9. A system as recited in claim 1, wherein the classifier is configured to separate between about 5 wt % to about 25 wt % of reagent particles into the coarse solids recovery stream.

10. A system as recited in claim 1, wherein the coarse solids recovery stream is connected to inject recovered coarse reagent particles into the reactor proximate a position where the recycle stream injects recycled reagent particles into the reactor.

11. A circulating dry scrubbing process comprising:
    passing flue gas through circulating particles of sorbent within the reactor of a circulating dry scrubber system as recited in claim 1 to reduce pollutants from flue gas;
    filtering particles out of a stream of treated flue gas from the reactor with the particulate capture component in fluid communication with the reactor;
    separating particles into the recycle stream connected to the reactor for reuse in the reactor, and into the purge stream using the recycle diverter connected to the particulate capture component to receive sorbent particles therefrom;
    recovering coarse particles from the purge stream by classifying particles from the purge stream into the coarse solids recovery stream, connected to recover coarse solids from the classifier into the reactor, and the waste stream for disposal of fine particles from the classifier; and
    feeding the coarse solids recovery stream back to the reactor.

12. A process as recited in claim 11, further comprising comminuting coarse reagent particles with a comminutor selectively connected to receive coarse reagent solids from the coarse solids recovery stream for comminution, and supplying comminuted solids from the coarse solids recovery stream to the reactor.

13. A process as recited in claim 11, wherein the step of classifying includes continuously receiving particles from the purge stream and continuously recycling coarse solids to the reactor.

14. A process as recited in claim 11, wherein the step of classifying includes dividing up to about the coarsest 30% by weight of the purge stream into the coarse solids recovery stream.

15. A process as recited in claim 11, wherein the step of classifying includes dividing particles greater than about 50 µm in diameter into the coarse solids recovery stream.

16. A process as recited in claim 11, wherein the step of classifying includes dividing particles greater than about 70 µm in diameter into the coarse solids recovery stream.

17. A process as recited in claim 11, wherein the step of classifying includes classifying particles from the purge stream into a coarse solids recovery stream using a classifier of a type selected from the group consisting of a dynamic classifier, cyclone, settling chamber, fluidized bed classifier, sieve screen separator, triboelectric separator, and electrostatic precipitator.

18. A process as recited in claim 11, further comprising fluidizing reagent particles during classification with a heated motive gas stream in fluid communication with the classifier.

19. A process as recited in claim 11, wherein the step of classifying includes separating between about 5 wt % to about 25 wt % of reagent particles into the coarse solids recovery stream.

20. A process as recited in claim 11, further comprising injecting recovered coarse reagent particles into the reactor proximate a position where the recycle stream injects recycled reagent particles into the reactor.

\* \* \* \* \*